United States Patent
Sun et al.

(10) Patent No.: US 8,045,557 B1
(45) Date of Patent: Oct. 25, 2011

(54) GROUP COMMUNICATION THROUGH BROADCAST CHANNELS

(75) Inventors: Yaojun Sun, South Riding, VA (US); Jing Qu, Reston, VA (US)

(73) Assignee: Clear Wireless LLC, Kirkland, WA (US)

( * ) Notice: Subject to any disclaimer, the term of this patent is extended or adjusted under 35 U.S.C. 154(b) by 266 days.

(21) Appl. No.: 12/040,454

(22) Filed: Feb. 29, 2008

(51) Int. Cl.
*H04L 12/56* (2006.01)

(52) U.S. Cl. ...... 370/390; 370/229; 455/435.1; 455/452.2; 455/519; 725/97; 725/115; 725/118

(58) Field of Classification Search ........... 370/229, 370/390; 455/87, 91, 92, 97, 114, 115, 118; 725/435.1, 452.2, 519
See application file for complete search history.

(56) References Cited

U.S. PATENT DOCUMENTS

| | | | | |
|---|---|---|---|---|
| 7,296,091 | B1 * | 11/2007 | Dutta et al. | 709/245 |
| 2006/0239195 | A1 * | 10/2006 | Camins et al. | 370/235 |
| 2007/0130597 | A1 * | 6/2007 | Parker et al. | 725/94 |
| 2007/0177592 | A1 * | 8/2007 | Mooney et al. | 370/390 |
| 2007/0189290 | A1 * | 8/2007 | Bauer | 370/390 |
| 2009/0019112 | A1 * | 1/2009 | Venner et al. | 709/204 |
| 2009/0150943 | A1 * | 6/2009 | Vasudevan et al. | 725/86 |
| 2009/0168679 | A1 * | 7/2009 | Benjamim et al. | 370/312 |
| 2009/0185522 | A1 * | 7/2009 | Periyalwar et al. | 370/328 |
| 2009/0219850 | A1 * | 9/2009 | Lin et al. | 370/312 |
| 2009/0248886 | A1 * | 10/2009 | Tan et al. | 709/231 |

* cited by examiner

*Primary Examiner* — Luat Phung
(74) *Attorney, Agent, or Firm* — Shook, Hardy & Bacon L.L.P.

(57) ABSTRACT

Methods, media, and systems are provided for optimizing the use of broadcast channels for group communication streams on a wireless telecommunications data network. Transmission proxy servers associated with base stations are used to determine whether a broadcast channel or unicast channel is most efficient for transmission of a group communication stream. Transmission proxy servers examine factors such as number of users, movement, duration and bandwidth required to make the channel determination. A contact management server coordinates the authentication across multiple access networks in coordination with the transmission proxy servers. Delivery can be more flexible, higher service levels can be more easily guaranteed, and secure but seamless handoffs are possible utilizing the claimed embodiments.

14 Claims, 5 Drawing Sheets

GROUP COMMUNICATION THROUGH BROADCAST CHANNELS

SUMMARY

The present invention is defined by the claims below, but summarily, embodiments of the present invention provide for methods, media, and systems for optimizing the use of broadcast channels for group communication streams on a wireless telecommunications data network. Using transmission proxy servers (TPS) at base stations, a determination can be made whether a broadcast channel or unicast channel is most efficient for transmission. Transmission proxy servers examine factors such as number of users, movement, duration and bandwidth required to make the channel determination. A contact management server (CMS) coordinates the authentication across multiple access service networks in coordination with the transmission proxy servers. The present invention has several practical applications in the technical arts. Networks with bandwidth constraints, such as those using wireless microwave access, can be more flexible in delivering group communication streams, such as video conferencing, to users. Efficiency of bandwidth consumption allows wireless providers to more easily guarantee higher service levels. By coordinating streams in multiple sectors, seamless handoffs are possible from one area to another even with authentication requirements in place.

In a first aspect, computer-readable media are provided for performing a method of minimizing the bandwidth consumed in a group communication data stream in a wireless telecommunications network. A base station is capable of sending a group communication stream by broadcasting the stream or unicasting the stream through a data channel. A group communication request is communicated from a user to a transmission proxy server logically coupled with a base station. A first group communication stream is sent to the transmission proxy server. At the transmission proxy server, a determination is made whether a most efficient use of bandwidth occurs by communicating the stream utilizing a broadcast channel or a unicast data channel. The stream is communicated through the most efficient channel from the base station. Subsequent requests are communicated to the transmission proxy server and determinations for utilizing broadcast channels or unicast channels are made. The requests are forwarded and authentication information is communicated from the group communication server to a contact management server for authentication or denial of the request.

In a second aspect, a method of efficiently utilizing bandwidth for video-conferencing in a wireless network is provided. The wireless network has a connectivity services network portion and an access services portion made up of one or more access service networks. A request is communicated from a user to a base station in an access services network. The request is forwarded to a transmission proxy server associated with the base station and then on to a video conferencing server. A video conferencing stream is communicating from the video-conferencing server to the transmission proxy server where, a channel selection is determined for the most efficient use of bandwidth in the access network. The channel selection utilizes either a broadcast channel or a unicast channel. The video conferencing stream is sent utilizing the most efficient channel. Subsequent requests are received at the transmission proxy server and most efficient channels to send video conferencing streams associated with the subsequent requests are determined. The subsequent streams are sent via the most efficient channels.

In a third aspect, a system for optimal delivery of video conferencing streams in a wireless microwave access network is provided. The network includes one or more sectors serviced by at least one base station. One or more contact management servers receive requests to authenticate users to one or more video conferencing servers on a connectivity services network. One or more video transmission proxy servers are associated with each base station in the wireless microwave access network. Each transmission proxy server communicates with the video conference servers to receive video conferencing streams and determines whether streams will be sent through a broadcast channel or a unicast data channel by the base stations.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems, media, and methods for optimal use of broadcast channels on a wireless telecommunications data network for group communication streams. Using transmission proxy servers (TPSs) at base stations, a determination can be made whether a broadcast channel or unicast channel is most efficient for transmission. The number of users, movement, duration, and bandwidth required all may be factored into the channel determination. In addition, authentication is coordinated by a contact management server (CMS). This allows the authentication information to be shared across multiple access service networks (ASNs) through communication between the transmission proxy servers.

Acronyms and Shorthand Notations

Throughout the description of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| ASN | Access Service Network |
| BS | Base Station |
| BSC | Base Station Controller |
| CMS | Contact Management Server |
| CSN | Connectivity Services Network |
| IP | Internet Protocol |

| | |
|---|---|
| SOFDMA | Scalable Orthogonal Frequency Division Multiple Access |
| TPS | Transmission Proxy Server |
| WiMAX ™ | Wireless Microwave Access |

Further, various technical terms are used throughout this description. An illustrative resource that fleshes out various aspects of these terms can be found in *Newton's Telecom Dictionary* by H. Newton, 22$^{nd}$ Edition (2006).

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
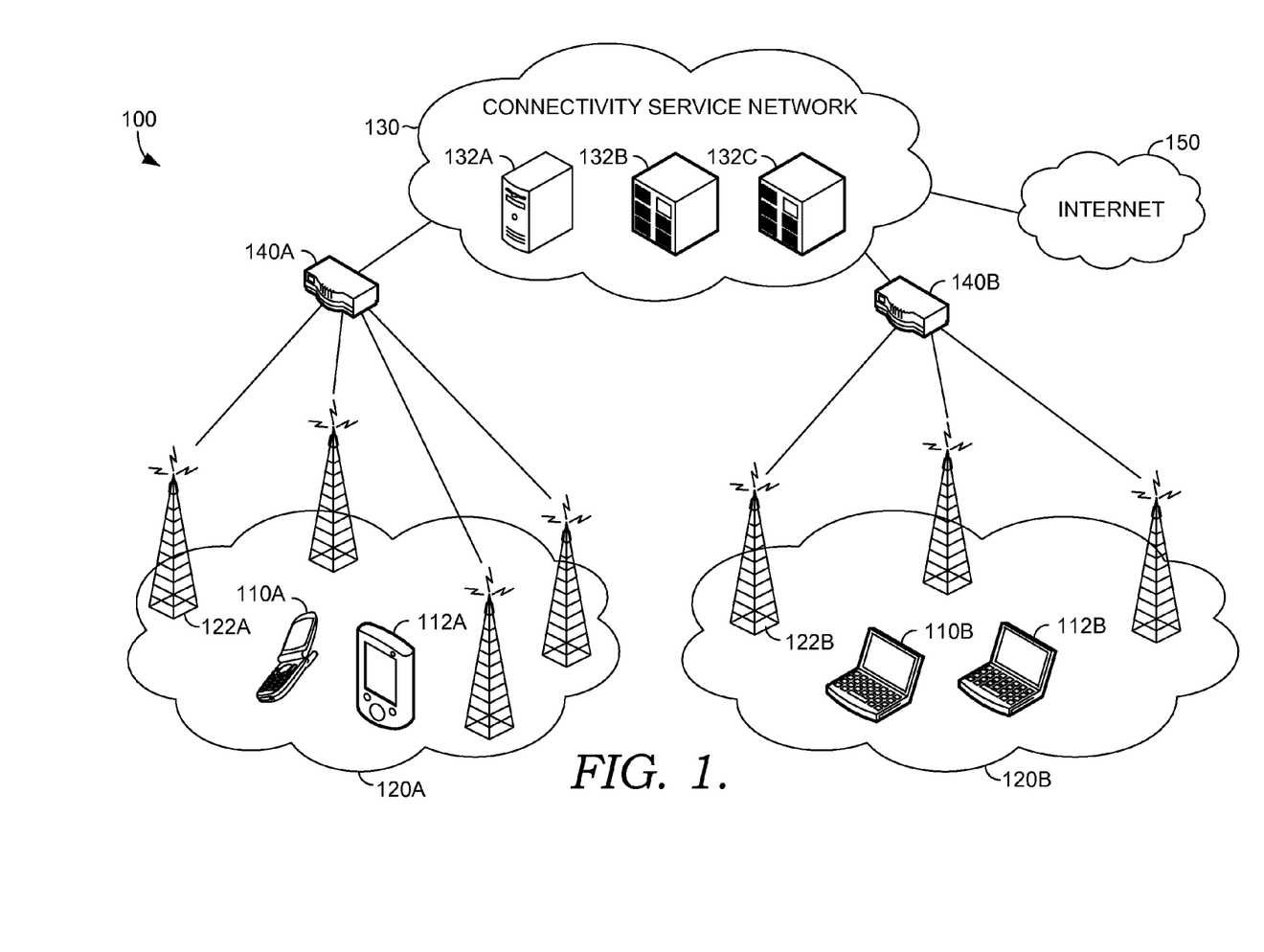
FIG. 1 is a simplified view of an exemplary wireless telecommunications environment suitable for practicing an embodiment of the present invention.

In the figures and succeeding descriptions, like numbering will be used where possible. FIG. 1 depicts an illustrative environment 100 suitable for operating a wireless telecommunications network. Environment 100 is meant to be illustrative in nature and should not be construed as limiting the scope of the invention to the specific configurations or quantities of components shown. Environment 100 is depicted as two types of non-distinct networks, a connectivity service network 130 and two access service networks 120A and 120B. Other embodiments of the present invention may have more than one connectivity service network 130. Similarly, embodiments may and likely will have more than two access service networks. Only two have been depicted for the sake of clarity. The division of the two types of networks again is for illustrative purposes only and there can be overlap in equipment and function between the CSN and ASNs. Finally, CSN 130 is connected to an internet connection 150 in order to provide world wide web connectivity to the devices of CSN 130 and ASNs 120A and 120B.

Connectivity service network 130 is depicted with a plurality of servers 132A, 132B, and 132C. While server 132A is shown to be different from servers 132B and 132C, this is again merely for illustration. There can be more than three servers, and all may be of similar types or all may be different in function and operation. Some computing devices on CSN 130 need not be servers at all, but may be other sorts of computing devices, such as gateways, gateway controllers, routers, databases and the like. The basis for depicting connectivity service network 130 is to show a collection of servers and equipment that provide a common backbone for one or more access networks to communicate with a network provider and/or with other access networks. An access service network gateway 140A is shown connecting CSN 130 to access service network 120A, while a substantially similar ASN gateway 140B is shown to connect CSN 130 to ASN 120B. Again this is to show one environment in which a network may provide wireless access to users. Shown in ASN 120A is a base station 122A. There are three other base stations shown but not numbered for clarity. Also not shown or numbered are associated base station controllers, which are understood perform a number of functions for associated base stations by allocating bandwidth, routing connections, and converting signals, along with multiple other tasks.

A first wireless access device 110A and a second wireless access device 112A also are depicted in ASN 120A. While access device 110A is shown as a cellular telephone and access device 112A is shown as a hybrid phone and personal data assistant (PDA) unit. Neither device is selected to limit the types of devices that may operate in ASN 120A. In fact, conventional PDAs, laptops, and personal computers could all use ASN 120A. Access service network 120A is not intended to be limited to two devices or four base stations. ASN 120B shows two laptop computers, which are numbered 110B and 112B. Both can send and receive wireless communications from base station 122B, or from a substantially similar one. Again, several base stations are depicted but not numbered for illustration. ASNs 120A and 120B are not meant to require any particular wireless network protocol, but may use a number of different signaling means. One example is scalable orthogonal frequency division multiple access (SOFDMA) protocol, which could be used in a microwave access setting. This example may be compatible with various standards-based networks, as exemplified by a WiMAX™ compliant network. This should be understood as a network and devices meeting the promulgated standards of the WiMAX Forum® administered in Beaverton, Oreg. However, this should not be construed as a limitation of the claimed embodiments of the present invention.

Figure 2:
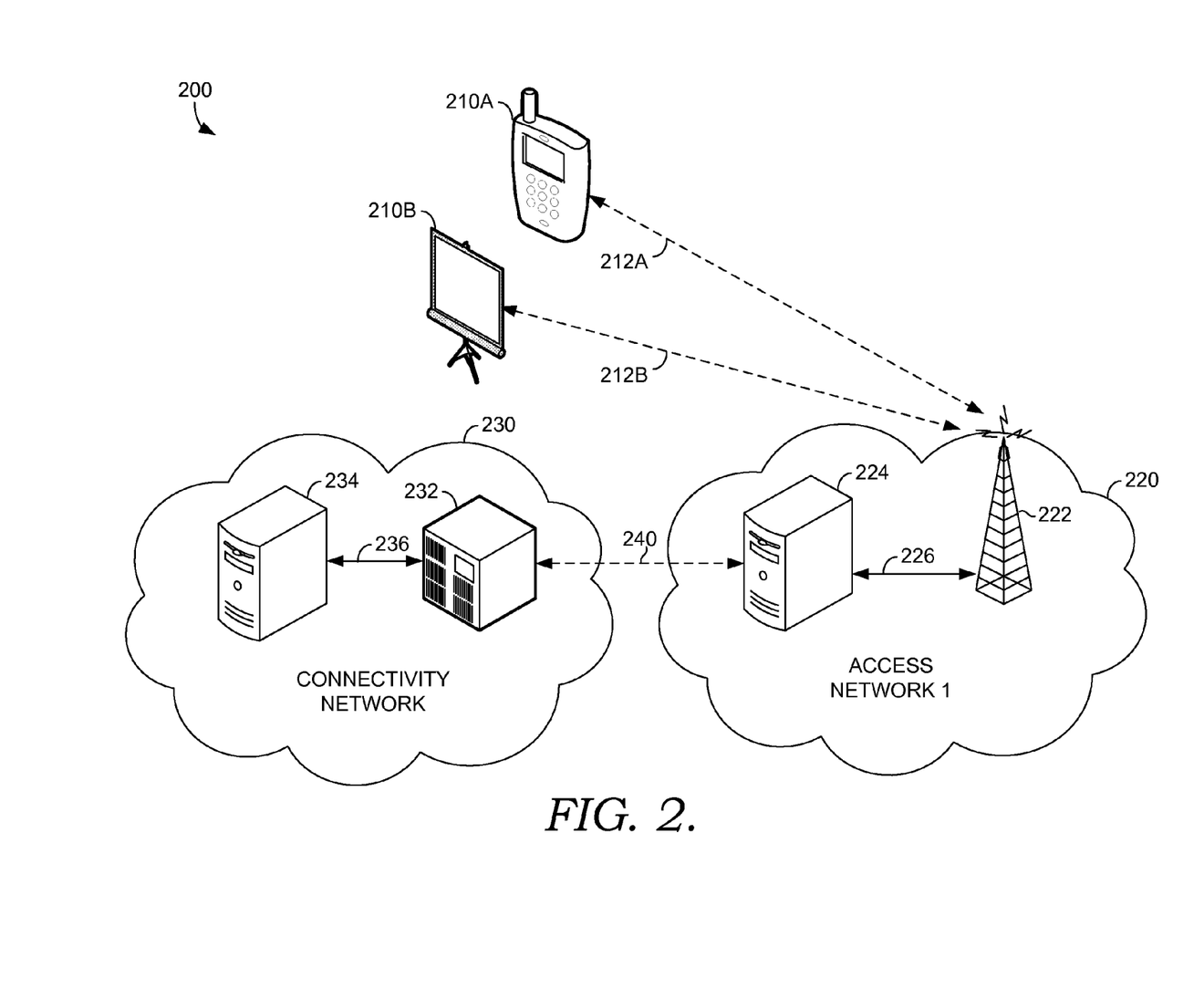
FIG. 2 is a simplified depiction of an exemplary environment for utilizing claimed embodiments of the present invention.

Turning now to FIG. 2, a simplified depiction of an exemplary environment 200 for utilizing claimed embodiments of the present invention is provided. Contained in exemplary environment 200 is an access services network 220 and a connectivity services network 230, which are each substantially similar to the previously described networks. In addition to a base station 222 in access services network 220, however, there is also a transmission proxy server 224. The connectivity services network 230 is also shown to include two specific devices that enable use of the present invention, group communication server 232 and contact management server 234. A user 210A and a user 210B are shown to be in communication with base station 222 on ASN 220.

Continuing with FIG. 2, group communication server 232 is a streaming application server that allows users to communicate a data stream between two or more users. In a typical telecommunications data network, this will only supply the actual streaming "content" between the conferees. While some streaming servers allow anyone to access their content, such as web sites that provide multi-media content, typically a group communication stream will also require permission to enter. The ability to authenticate users to the group communication stream is not actually carried out by group communication server 232. In the claimed embodiments of the present invention, this is a task accomplished by CMS 234. An example of a group communication server is a video-conferencing server.

The figure shows group communication server 232 and contact management server 234 connected by a dotted line. This is to show that the connection between the two devices need not be direct, but may have intermediate devices between them. For instance, group communication server 232 may be in a different facility than CMS 234 and therefore devices such as routers, switches, and gateways may be necessary to connect the two. By the same measure, group communication server 232 and CMS 234 could be located in very close proximity and wired directly to one another. Neither configuration or any other possible means of connecting the two should be construed as limiting the present invention, but is contemplated within the scope of the claimed embodiments.

In addition, it should be understood that CNS 230 is not limited to a single group communication server. To the contrary, many more group communication servers may be available to provide additional services to users of connectivity network 230. Likewise, if there are a large number of users for CSN 230, more than one contact management server similar to CMS 234 may be necessary. One of each is shown for the sake of clarity and to provide exemplary operation. The particular protocols with which users are authenticated and given access to the streams of group communication server 232 are not limited to any single embodiment, but should contemplate that users are checked in some manner for proper access credentials. Similarly, contact management server 234 needs not implement a particular set of rules for access.

Group communication server 232 is connected to transmission proxy server 224 by a connection 240. Once again, this is shown as a dotted line to denote the variable nature of the connection. This could be through any number of the devices listed above for connecting elements of a telecommunications network. They could also be directly connected through conventional means such as cable, fiber optics, or other transmission means. The claimed embodiments of the present invention do not contemplate a particular connection, but rather simply that there is a logical connection of the two elements. Similarly, transmission proxy server 224 is also connected to base station 222 by a logical connection of a variable nature shown by a connection 226. As an example, transmission proxy server 224 could be located at the same facility as connectivity services network 230, or could be present at the same location as base station 222. As mentioned above, the distinction of CSN 230 and ASN 220 may not as easily drawn as the depiction in FIG. 2 shows. Elements and connections of the two networks may overlap during implementation.

Transmission proxy server 224 provides decisioning logic in order to determine how the stream provided by group communication server 232 will be delivered. Base station 222 has two options in providing a stream to a user, either as a unicast data stream or a broadcast stream. While the number of users is unlimited with a broadcast stream (with the exception of the number of users that may be authenticated at any one time), the bandwidth available for broadcast typically is limited. As an example, if 5 Megahertz (MHz) of bandwidth is available for broadcast, and each channel requires 1 MHz, then only five conferences may be broadcast at one time. Spectral division can vary from base station to base station, but will have to factor the bandwidth allocated to unicasts, conference broadcasts, and other types of broadcasted content (such as streaming television). When the number of users is low, unicast transmission will not differ greatly from broadcast in terms of efficiency. However, if the number of users of particular content is high and those users are located within the transmission range of the same base station, then the efficiency increases. Thus, the decision on whether to broadcast or unicast the video conferencing stream is made at the base station by the transmission proxy server. This decisioning will be discussed in more detail below with respect to FIG. 5.

Figure 3:
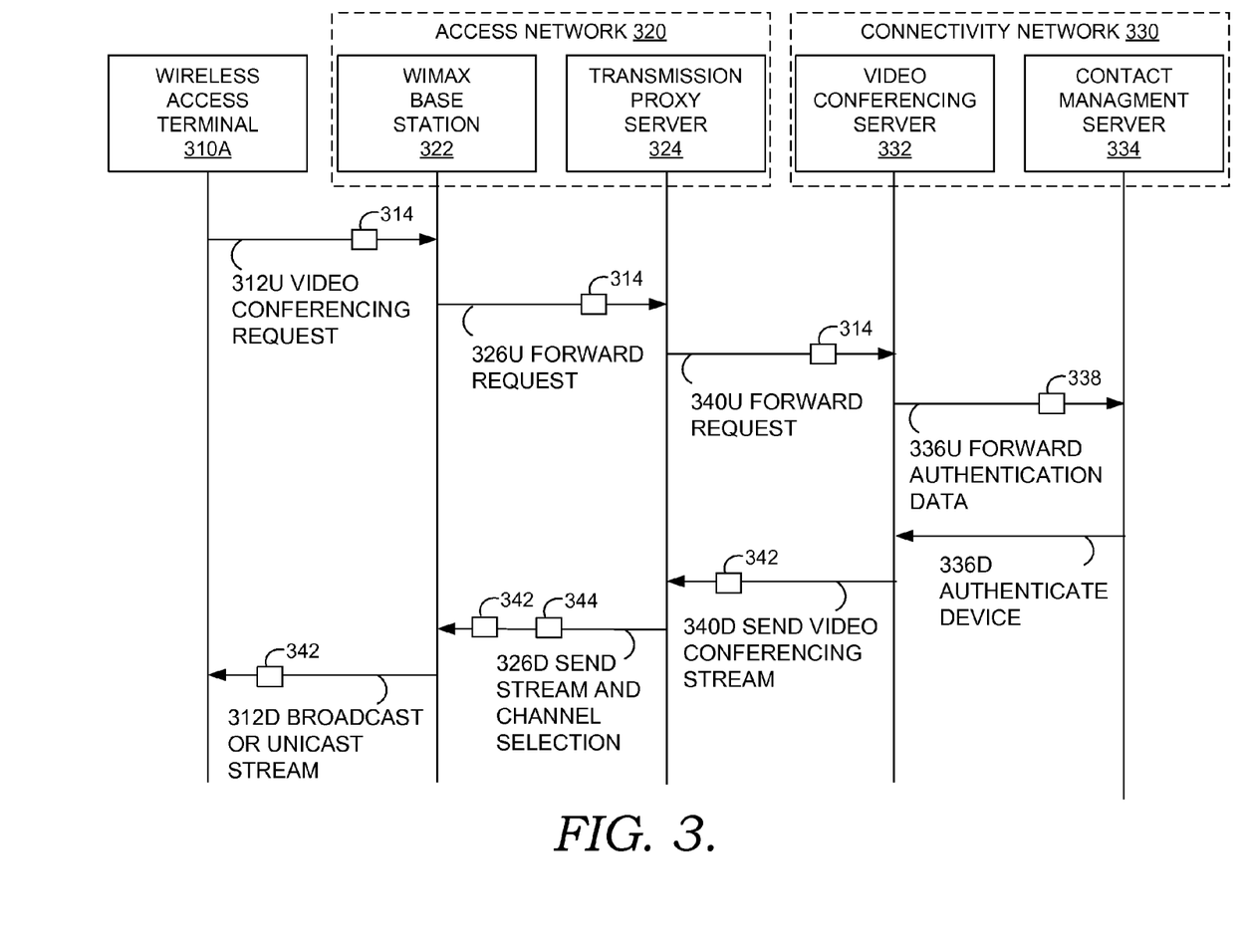
FIG. 3 is a flowchart showing a video conference request and stream completion.

Turning to FIG. 3, a flowchart showing a video conference request and completion of that request's stream is shown. The initial "U" will be used to denote steps taking place in an upstream flow and "D" will be used to show those happening in a downstream manner. At a step 312U, a video conferencing request is sent that includes request data 314. This request data is sent from a wireless access terminal 310A, which is substantially similar to one shown as user device 210A or 210B. The request is received at wireless base station 322 and is forwarded to a transmission proxy server 324 at a step 326U. This is shown in the figure as transmitting the same data 314, although it could be the case that data 314 goes through a conversion of some sort at base station 322 in order to communicate with TPS 324. At a step 340U, the request is forwarded from TPS 324 to a video conferencing server 332. Again, this sends the same data 314, despite any conversion that takes place. This is also understood to be the step when the data is transmitted from an access services network 320 to a connectivity services network 330.

At a step 336U, video conferencing server 332 separates a portion of request 314 from the remainder of the data to form a segment of authentication data 338. Data 338 is then transmitted to a contact management server 334 in order to verify that the request is being sent from a user or device that has the authority to request the video conferencing stream it has specified. Provided that authentication data 338 grants wireless access terminal 310A access to the video conferencing stream requested, then the device is authenticated between CMS 324 and video conferencing server 332 at a step 336D. At a step 340D, a data stream 342 is sent from video conferencing server 332 to TPS 324. At transmission proxy server 324, a decision can be made to determine through what channel data stream 342 will be sent to wireless access terminal 310A. This determination will be discussed with greater detail through description of FIGS. 4 and 5. A data segment 344, which denotes the selected channel, and data stream 342 are sent to base station 322 at a step 326D. Upon reception of these two pieces of information, wireless base state 322 can then transmit data stream 342 to wireless access terminal 310A at a step 312D.

Figure 4:
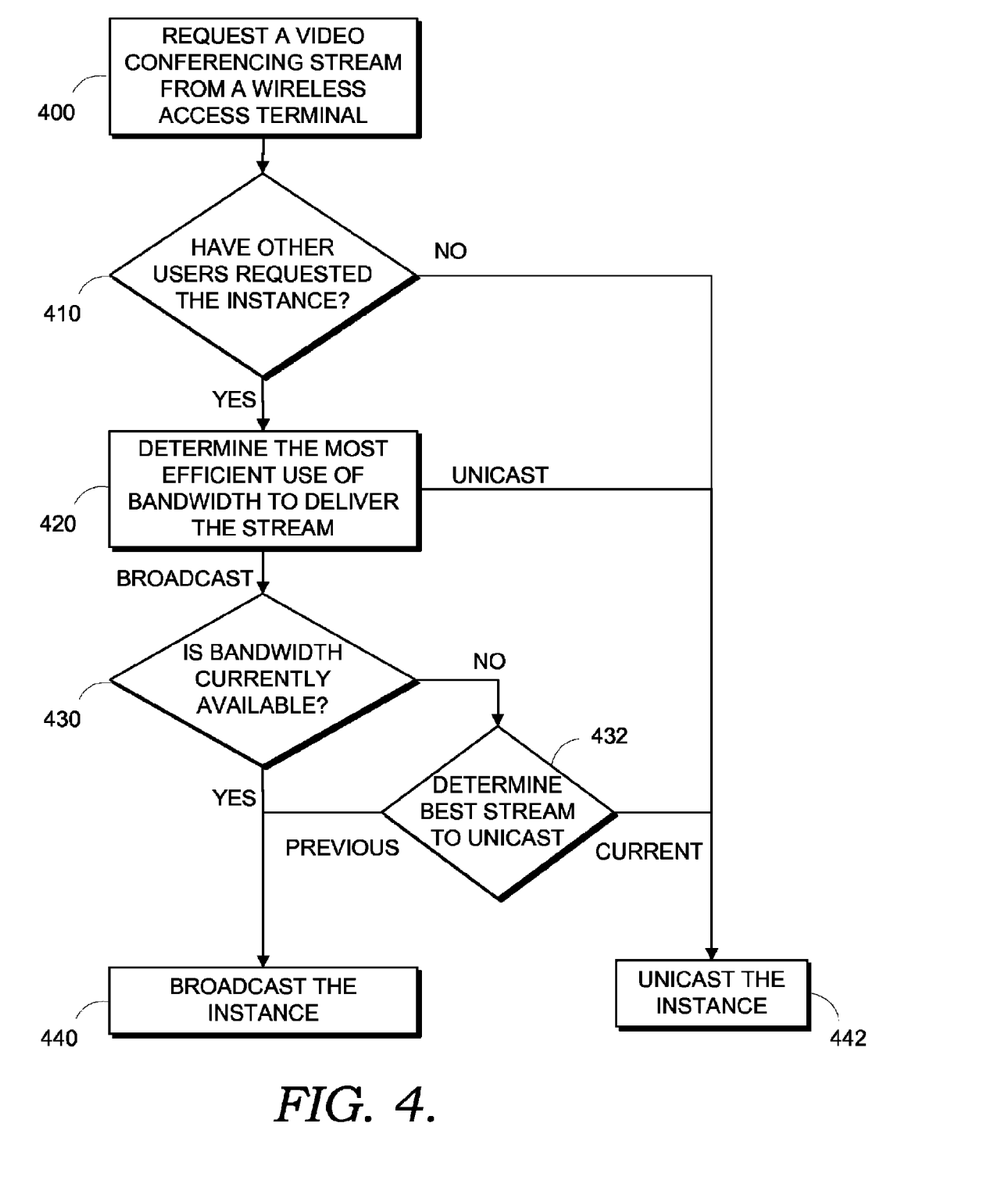
FIG. 4 is a flowchart depicting a method for differentiating between unicast and broadcast streams.

Moving now to FIG. 4, a flowchart depicting a method for differentiating between unicast and broadcast streams is shown. At a step 400, a user requests a video conferencing stream to be delivered from the video conferencing server to the wireless access terminal. At a step 410, a transmission proxy server determines whether the stream is already the subject of an active request or stream. If it is not, then a unicast transmission of the stream does not use any more bandwidth than a broadcast stream because only a single user requires that bandwidth. As a result, at a step 442 the instance can be unicast. If other users have requested the instance, i.e. if the stream is already active, then the transmission proxy server must determine the most efficient channel at a step 420. There are a number of factors or steps that can be used to make this determination, which are depicted in FIG. 5.

Regardless of the method used to determine the channel used, either a unicast or broadcast determination will be made. If the unicast method is found to be the most efficient, then the method again proceeds to a step 442 to unicast the instance. If a broadcast channel is determined to be the most efficient, then the TPS must determine if bandwidth is available at a step 430. If there is bandwidth available, the instance is broadcast at a step 440. If there is not bandwidth available, the transmission proxy server must determine which instance should unicast at a step 432. It is possible, even though broadcast is the most efficient means of transmission, that the instant stream is the least efficient of those currently selected for broadcast. Thus, the instance of a video conferencing stream that must be unicast is still the instant one, and it is unicast accordingly at a step 442. If the stream is not the best candidate for unicast, then one of the previously broadcast streams becomes a unicast instance and the current stream is broadcast at a step 440.

Several illustrations can be given to further describe the above process. As described earlier, a typical base station broadcast area or sector may have 5 MHz of bandwidth available for video conferencing streams, with a 1 MHz stream size, resulting in five available channels. In this scenario, a single request for conference A in a sector A is transmitted through a unicast data stream. If a second request is received for conference A, but in a sector B, the two streams are still continued to be unicast as bandwidth savings are still unavailable. A second request for conference A in sector A may lead to broadcasting the stream because only half of the bandwidth used for unicasts would be needed and bandwidth savings occur. If conferences B, C, D, and E in sector A each had 10 requests, they would be broadcast as well, to use one tenth of the bandwidth required to unicast each request. If conference A was ongoing, and conference F began with 10 requests, the transmission proxy server could make the determination to unicast conference A, which has only two users. If a conference G then begins with five users, it may be determined that broadcast streaming is more efficient than unicast at step 420, but that the 10 users on each of channels B-F outweigh the five users on channel G. As a result, conference G is unicast because of the determination made at step 432. Thus, the greatest bandwidth savings may occur when the highest number of users in a given area are on broadcast channels.

Figure 5:
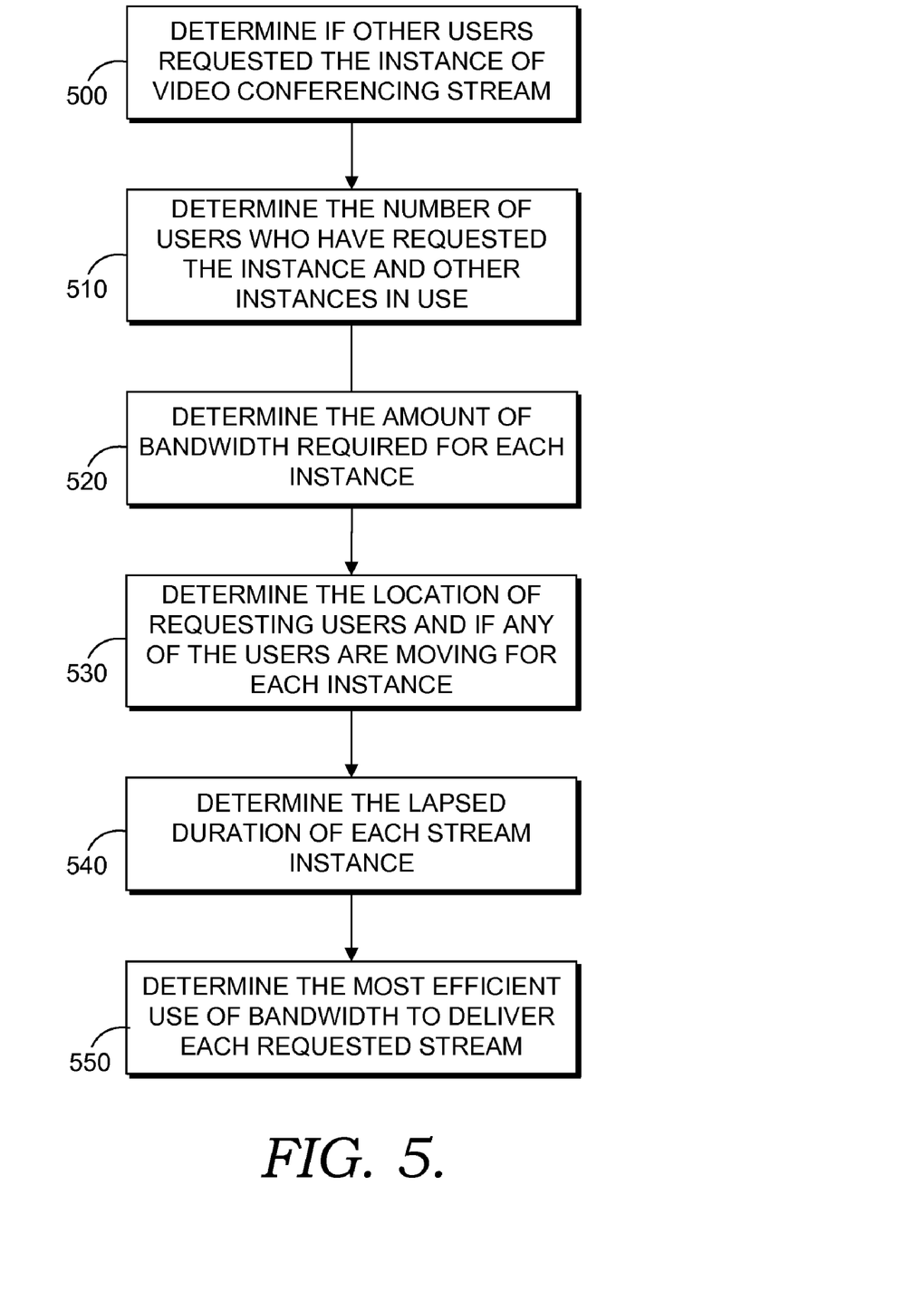
FIG. 5 is a flowchart showing a method for determining the most efficient channel through which to transmit a stream.

FIG. 5 is a flowchart showing a method for determining the most efficient channel through which to transmit a given stream. At a step 500, the transmission proxy server determines if other users have requested the instance of the video conferencing stream in that particular area or sector. If no other user currently is streaming that instance, then the difference between unicast and broadcast is negligible and will not factor in to the determination. Thus, a stream with a single user may always be unicast if the provider decides to ignore differences in stream size, assuming there are any differences. At a step 510, the TPS determines the number of users requesting the stream along with other active streams in the sector. Typically, the number of channels available will determine the number of streams with the highest user total that will be broadcast, i.e. if five channels are available, the five highest totals will be broadcast. There may be other factors as will be seen below, but in any determination method, the number of active users will be needed. If streams vary in size, then the bandwidth required by each of the current streams must be determined at a step 520. This may be an optional step and will depend on the streaming content. If only one type of stream is available and it does not vary in size, the step may be skipped altogether. Streams that vary significantly in size may result in a different comparison. In that instance, streams with smaller numbers of users, but bigger consumption of bandwidth, actually become more important to broadcast than smaller-consuming streams with larger audiences.

Continuing with FIG. 5, two more factors for the overall determination must be examined that are less intuitive but important nonetheless. At a step 530, a determination is made as to whether or not the devices/users are moving. If there are a number of users that are located on the outer edges of a sector and are moving toward other sectors, the transmission proxy server may determine it is more efficient to unicast those respective streams rather than broadcast them. A stream with slightly smaller bandwidth usage but stationary members may be a more judicious use of available broadcast channels than a simple determination of bandwidth usage based on sheer bandwidth consumption. A related determination is made at a step 540, when the duration of the stream is ascertained. If unicast bandwidth is available, a larger group with a brief stream may not supplant a smaller group requiring a longer window of time. Because the transmission proxy server continues to monitor users and usage, this could be a fluid situation in which after a specified amount of time conference B, with more users, replaces conference A, having fewer users but a long active duration. Using a combination of factors, the most efficient channel for each stream is selected at a step 550. The above method is not meant to provide limitation or a specific weighting of values for making this determination. It should be understood that there may be other factors that can be examined by the TPS in order to determine the most efficient means of delivering streams.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed is:

1. One or more computer-readable media having computer-usable instructions embodied thereon for performing a method of minimizing the bandwidth consumed in a group communication data stream in a wireless telecommunications network, wherein a base station is capable of sending a group communication stream by broadcasting the stream or unicasting the stream through a data channel, the method comprising:

communicating a group communication stream request from a first user to a transmission proxy server logically coupled with a base station;

sending a first group communication stream to the transmission proxy server;

at the transmission proxy server, determining if a most efficient use of bandwidth occurs by communicating the first group communication stream utilizing a broadcast channel or a unicast data channel;

communicating the first group communication stream through the most efficient channel from the base station;

communicating subsequent requests to the transmission proxy server;

determining whether a more efficient use of bandwidth occurs when subsequent group communication streams that are associated with subsequent requests are sent through broadcast channels or unicast channels, based on a bandwidth requirement of each stream and a lapsed temporal duration of each stream; and sending the subsequent group communication streams through the most efficient channels.

2. The media of claim 1 further comprising:
forwarding the group communication stream request from the transmission proxy server to a group communication server; and
communicating authentication information from the group communication server to a contact management server, wherein the contact management server authenticates or denies users' requests.

3. The media of claim 2, wherein the authentication information is stored at the transmission proxy server.

4. The media of claim 3, wherein movement from a first base station to a second base station results in transmitting the authentication information regarding the request and stream from a first transmission proxy server to a second transmission proxy server.

5. The media of claim 1, wherein determining the most efficient use of bandwidth automatically selects a unicast data channel if a streaming instance has only one active user request.

6. The media of claim 2, wherein the group communication server is a videoconferencing server.

7. A method of efficiently utilizing bandwidth for videoconferencing in a wireless network, wherein the wireless network has a connectivity network portion and an access portion made up of one or more access networks, the method comprising:
communicating a first request from a first user to a base station in a first access network;
forwarding the first request to a transmission proxy server associated with the base station;
forwarding the first request from the transmission proxy server to a video conferencing server;
communicating a first video-conferencing stream ("first stream") from the videoconferencing server to the transmission proxy server;
at the transmission proxy server, determining a channel selection for efficient use of bandwidth in the first access network based on a bandwidth requirement of each stream and a temporal duration of each stream, wherein the channel selection utilizes either a broadcast channel or a unicast channel;
sending the first video-conferencing stream utilizing the most efficient channel;
receiving subsequent requests at the transmission proxy server;
determining most efficient channels to send video-conferencing streams associated with the subsequent requests; and
sending the subsequent streams via the most efficient channels
at the transmission proxy server, determining whether unicast or broadcast is more efficient for the first stream;
when unicast is more efficient, then unicasting the first stream;
when broadcast is more efficient, then determining whether bandwidth is available for broadcasting the first stream;
when bandwidth is available, then broadcasting the first stream;
when bandwidth is not available, then switching another stream from broadcast to unicast, and then broadcasting the first stream.

8. The method of claim 7 further comprising:
communicating authentication information associated with the first request to a contact management server.

9. The method of claim 8, wherein the authentication information is stored at the transmission proxy server.

10. The method of claim 7, wherein determining whether unicast or broadcast is more efficient for the first stream includes determining if the first stream has been previously requested.

11. The method of claim 10, wherein when the first stream has not been previously requested, unicast is determined to be more efficient.

12. The method of claim 7, wherein broadcast is determined to be more efficient for the first stream when the first stream has more active requests than a second stream.

13. The method of claim 7, the method further comprising determining whether unicast or broadcast is more efficient for subsequent streams, wherein determining whether unicast or broadcast is more efficient for the subsequent streams includes determining whether streams on broadcast channels should be moved to unicast channels and whether streams on unicast channels should be moved to broadcast channels.

14. A system for optimal delivery of video conferencing streams in a wireless microwave access network, wherein the network includes one or more sectors serviced by at least one base station, the system comprising:
one or more contact management servers that receive requests to authenticate users to one or more video conferencing servers; and
one or more video transmission proxy servers, wherein the one or more video transmission proxy servers store authentication information to send to the one or more contact management servers, wherein the authentication information is sent from a first video transmission proxy server to a second video transmission proxy server, and wherein each video transmission proxy server
(A) is associated with a base station in the wireless microwave access network,
(B) communicates with the one or more video conference servers to receive video-conferencing streams, and
(C) determines whether a video-conferencing stream will be sent through a broadcast channel or a unicast data channel by the base station, based on
a) how many users are requesting the video-conferencing stream,
b) the number of available channels,
c) whether the users are moving, and
d) a temporal duration of each video-conferencing stream,
wherein streams on broadcast channels are moved to unicast channels when efficiency is improved and bandwidth permits, and streams on unicast channels are moved to broadcast channels when efficiency is improved and bandwidth permits.

* * * * *